(12) United States Patent
Davis

(10) Patent No.: US 6,256,147 B1
(45) Date of Patent: Jul. 3, 2001

(54) COMPENSATING LAYER TO REDUCE WAVEFRONT ERRORS IN COATINGS ON MIRRORS FOR OPTICAL SYSTEMS

(75) Inventor: William J. Davis, Bedford, MA (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 07/612,369

(22) Filed: Nov. 14, 1990

(51) Int. Cl.$^7$ .................. G02B 1/10; G02B 5/08
(52) U.S. Cl. .............. 359/580; 359/584; 359/848; 359/884; 359/900
(58) Field of Search ...................... 359/580, 584, 359/589, 883, 884, 900, 848

(56) References Cited

U.S. PATENT DOCUMENTS

| | | | |
|---|---|---|---|
| 3,781,090 | * | 12/1973 | Sumita . |
| 4,195,908 | * | 4/1980 | Kestigian et al. . |
| 4,422,721 | * | 12/1983 | Hahn et al. . |
| 4,756,602 | * | 7/1988 | Southwell et al. . |
| 4,778,251 | * | 10/1988 | Hall et al. . |
| 4,966,437 | * | 10/1990 | Rahn ................... 359/580 |
| 4,993,824 | * | 2/1991 | Bluege . |

* cited by examiner

Primary Examiner—Ricky D. Shafer

(57) ABSTRACT

A method is disclosed for reducing or eliminating the wavefront error caused by variations in the thickness of an optical coating applied to a mirror without requiring that the thickness variation in the optical coating be reduced to reduce the wavefront error. The reduction in the wavefront error is achieved by adding a compensating layer to the top of the optical coating. The thickness of the compensating layer is directly proportional to the thickness of the optical coating and inversely proportional to one minus the index of refraction of the material used for the compensating layer.

4 Claims, 1 Drawing Sheet

SECTION A-A

SECTION A-A

SECTION B-B

COMPENSATING LAYER TO REDUCE WAVEFRONT ERRORS IN COATINGS ON MIRRORS FOR OPTICAL SYSTEMS

BACKGROUND OF THE INVENTION

1. Field of the Invention

This invention relates to optical systems in general and, in particular, to optical systems having reflecting elements containing multi-layer coatings on the reflecting surface.

2. Summary of the Prior Art

The use of multi-layer coatings to increase the reflectance of the front of an optical surface, for example a mirror, is well known in the art. Multi-layer reflection coatings are applied by alternately depositing layers of material, such as silicon dioxide and titanium dioxide, in alternating layers in thicknesses calculated by methods well known to those skilled in the art, to increase the reflectance of a reflecting surface at desired wavelengths. Many known techniques are available for depositing the multi-layer coatings. For example, they may be deposited in a coating chamber by sputtering or by electron beam deposition. It is also known that thickness variations in the coating across the surface of an optical element will cause wavefront errors in the optical beam reflected from the reflecting surface. It is well known and is a common problem in the field of depositing coatings that the uniform deposition of a multi-layer coating is difficult to achieve on a large optical component such as a reflecting mirror, due to the physical constraints of the coating chambers utilized for depositing optical coatings. In particular, it is often difficult to provide adequate spacing between the source of the material to be deposited and the surface to be coated to avoid the non-uniform deposition of material onto the surface to be coated. Frequently, the deposited coatings will be reasonably uniform in thickness in the center of the optical element but will gradually taper off by as much as twenty-five percent (25%) at the edge of a large optical element. While various techniques, such as rotation of the optical element to be coated and the use of masks, can be used to reduce the non-uniformity, it is difficult to entirely eliminate the wavefront error due to the variation in thickness of the deposited coating.

It is known that light that is reflected from a multi-layered dielectric coating experiences a phase shift that depends on the wavelength of the reflected light and the types and thicknesses of material forming the reflection coating. These effects combine to give a net phase shift on reflection. If the coating on the mirror's surface is non-uniform in thickness, the phase shift in one region of the mirror, for example at the location where the coating is thin, will not match the phase shift elsewhere, thereby causing a wavefront error in the reflected beam. The amount of the wavefront error is given approximately by the equation:

$$W \approx \frac{2\Delta T \cos\Theta}{\lambda} + \Delta\phi$$

where:

$W$ is the wavefront error in wavelengths $\Delta T$ is the variation in thickness across the optical part $\Theta$ is the angle of incidence of the light beam $\lambda$ is the wavelength of the light $\Delta\phi$ is the variation in phase at the coating surface across the optical part The first term is due to the undulation of the top surface of the coating while the second term (i.e. $\Delta\phi$) is due to the variation of thickness of the coating layers. In practice, the first term is usually much larger than the second term.

The wavefront error has only been a minor problem for most optical components, and thus this problem has received little study. Prior to this time the only technique used to reduce the wavefront error has been to reduce the thickness variation. This invention has been developed to reduce the wavefront error even though a thickness variation is present.

SUMMARY OF THE INVENTION

Accordingly, a principal object of this invention is to provide a method for designing and manufacturing an optical coating that will reduce or eliminate the wavefront error due to variations in the thickness of an optical coating on an optical surface, for example a mirror.

Another object to this invention is to produce a method which will reduce wavefront error due to variations in thickness of an optical coating when a multi-layer coating is used.

A third object of this invention is to produce a method for reducing wavefront error due to the variation in thickness of an optical coating when a coating is deposited on a reflecting optical surface having a large surface area.

The above objectives and other advantages of the invention are achieved by using a compensating layer which is applied over the top layer of a reflection coating applied to an optical surface. The compensating layer compensates for variations in thickness of the reflection coating applied to the optical element to reduce phase errors due to variations in the thicknesses of the applied layers at different points across the reflecting surface of the optical element, thereby reducing the wavefront error introduced into the reflected signal due to non-uniformities present in the reflection coating.

It is expected that the compensating layer will have the same pattern of thickness variation as occurs in the multi-layer coating, the total variation in thickness will increase but the wavefront error will decrease as a result of the addition of the compensating layer.

BRIEF DESCRIPTION OF THE DRAWING

The above objects and other advantages of the invention will be appreciated after review of the detailed description of a preferred embodiment when read in conjunction with the drawings in which.

DETAILED DESCRIPTION OF A PREFERRED EMBODIMENT

Figure 1:
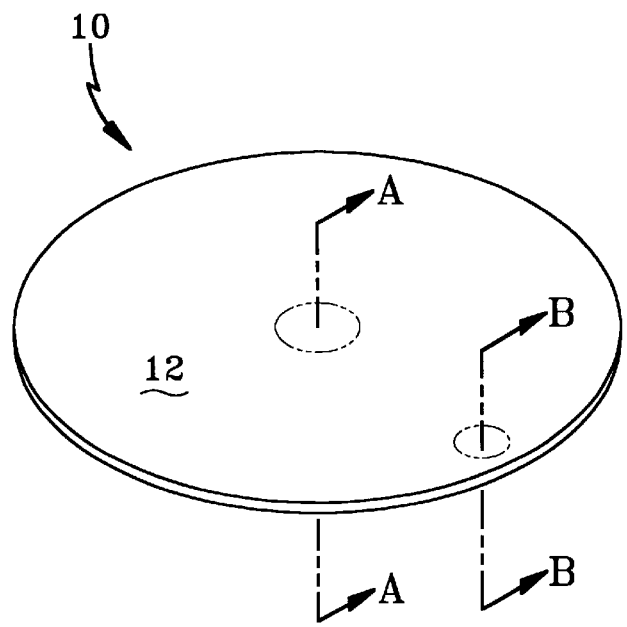
FIG. 1 is a view of a reflecting mirror having areas in which the applied coating varies in thickness at different areas of the optical element.

Referring to the drawing, FIG. 1 shows a reflecting mirror 10 having a reflecting coating composed of layers 14 and 16. These layers were deposited on the substrate surface 12. For example, the coating 14 may consist of a twenty-one layer coating composed of quarter-wave optical thickness alternating layers of titanium dioxide and silicon dioxide. The alternating layers of the reflection coating are deposited in a manner well known in the art, for example by electron beam deposition or by sputtering. It will be appreciated by those skilled in the art that due to the geometry of the coating chambers used for depositing materials on optical elements, such as reflecting coating of the foregoing design, non-uniformities in coating thickness can occur across the surface of the coated optical element, for example across the surface of the mirror 10. Thus, the thickness of each layer at location B is slightly different than the thickness at location A. Principally, such errors are due to the limited spacing permitted between the source of material to be deposited on the optical element and the position of the optical element relative to the source of the material in the coating chamber. Consequently, it is to be expected that the reflection coating 14 will have a thickness $t_1$ in a central portion of the optical element (i.e., at location A) and a reduced thickness $t_3$ at areas distant from the central area of the optical element 10 (i.e., at location B).

A discrepancy in the thickness of the reflecting coating across the surface of the coated optical element, such as the mirror 10 described above, can yield a significant phase error. Assume that the mirror 10 has a reflection coating 14 consisting of a twenty-one layer stack of alternating layers of titanium dioxide and silicon dioxide which have refractive indexes of 2.25 and 1.45 respectively. The titanium dioxide layers have a thickness of 0.11 micrometers and the silicon dioxide layers have a thickness of 0.172 micrometers. For purposes of this example, assume that the angle of incidence of the light is zero and that the coating 14 is one percent thinner at the edge (i.e., at location B) than it is in the central portion of the mirror (i.e., at location A). The phase at the surface of the nominal coating (that is in the central portion of the mirror) at a wavelength of 1.0 micrometers is 180° or 0.5000 waves, as can be determined by analysis using a computer program for optical coatings, for example the FILMSTAR program, available from FTG Software Associates, PO Box 579, Princeton, N.J. 08542. The phase at the surface of the one percent thinner coating is 182.253° or 0.50626 waves (182.253/360), a change of 0.50626−0.5000=0.00626 waves. The coating 14 is 2.9464 micrometers thick at location A and is 2.9169 micrometers thick at location B. It is thus 0.0295 micrometers thinner at the edge, so $\Delta T=-0.0295$. This produces a wavefront error (W) of $$W = \frac{2\Delta T}{\lambda} + .00626$$

$$W = \frac{2(-0.0295)}{1.0} + .00626$$

$W=-0.0526 \text{ waves}$ $W=-0.0526 \times 360°=-18.94°$

Figure 2:
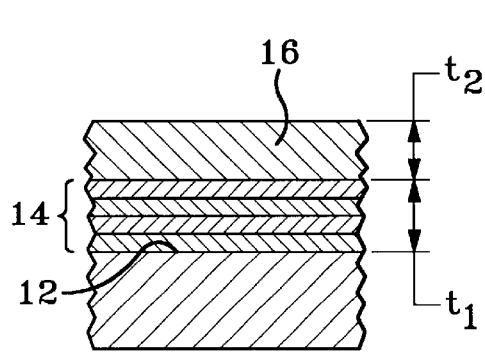
FIG. 2 is a side view of the mirror of FIG. 1 showing the thickness of the reflecting coatings and of the compensating layer at location "A"
Figure 3:
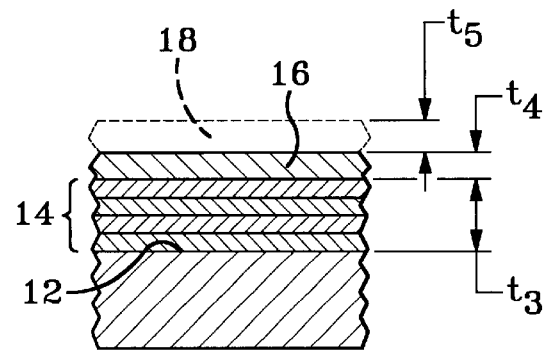
FIG. 3 is a side view of a portion of the mirror of FIG. 1 at location "B" where the reflecting coating and the compensating layer is thinner due to the coating manufacturing process.

Phase errors such as the foregoing which result from variations in thickness of an optical coating may be reduced or eliminated by the addition of a compensating layer 16 over the usual layers that form the reflecting coating; for example the layers 14. As is shown in FIGS. 2 and 3, the compensating layer 16 has a thickness $t_2$ in the central portion of the mirror. This layer will also have a reduced thickness $t_4$ toward the edge of the mirror 10. A dummy layer 18 having a thickness of $t_5$ is shown. The dummy layer has an index of a refraction of 1 (i.e. that of air) and is an artifice added for purposes of computing the phase error. The value of $t_5$ is chosen such that $t_5+t_4+t_3=t_1+t_2$. (See FIGS. 2 and 3 and note that the coating thicknesses shown in FIGS. 2 and 3 are not drawn to scale).

For purposes of this illustration, it is assumed that light approaches the coating at normal incidence (i.e., $\Theta=0$ in the equation). It will travel through the compensating layer 16, reflect at the top surface of the reflecting coating 14 and travel back through the compensating layer 16. For this example we will ignore the surface reflection at the top of the compensating layer (usually an antireflection coating makes this reflection small). The phase at the top of the compensating layer 16 at location A is given by:

$$\phi_c=2n\ t_2+\phi_R$$

where:

$\phi_c$ is the phase at the top of the compensating layer $\phi_R$ is the phase shift at the top of the reflecting coating n is the index of refraction of the compensating layer $t_2$ is the thickness of the compensating layer For purposes of this example it is to be assumed that all layers in the coating 14 are thinner by a small ratio E. The thickness of the layers at location B where the coating 14 is thin is:

$$t_3=(1-E)t_1$$

$$t_4=(1-E)t_2$$

$$t_5=t_1+t_2-t_3-t_4$$

$$t_5=E(t_1+t_2)$$

The phase at the reference surface above the thin coating is $\phi_r$, given by the equation:

$$\phi_r=2n\ t_4+2t_5+\phi_{RT}$$

The wavefront error $\Delta\phi$ is:

$$\Delta\phi=\phi_c-\phi_r=2\ n\ t_2+\phi_R-(2n\ t_4+2t_5+\phi_{RT})$$

Substituting for $t_4$ and $t_5$, $$\Delta\phi=2n\ E\ t_2-2E\ t_1-2\ Et_2+(\phi_R-\phi_{RT})$$

The term $(\phi_R-\phi_{RT})$ will normally be small. Consequently, an approximate solution for $\Delta\phi$ can be obtained by setting $(\phi_R-\phi_{RT})$ to 0, leaving:

$$\Delta\phi=2n\ E\ t_2-2E\ t_1-2E\ t_2$$

Since it is desired to find the value of $t_2$ that will cause the wavefront error to be zero, we set $\Delta\phi=0$ $$\Delta\phi=0=2n\ E\ t_2-2E\ t_1-2\ E\ t_2$$

Solving for $t_2$ $$t_2 = \frac{t_1}{n-1}$$

This formula gives the approximate thickness to use for the compensating layer 16 to be used on the top of the reflecting coating 14. Note that the value of $t_2$ does not depend on E, thus the technique will perform for any amount of thickness error.

A more exact value can be obtained by using a computer program for optical coatings to determine $\phi_R$ and $\phi_{RT}$ for coating 14.

As above, the equation for Δ100 is set to zero:

$$\Delta\phi = 0 = 2n\,E\,t_2 - 2E\,t_1 - 2E\,t_2 + (\phi_R - \phi_{RT})t_2(2n\,E - 2E) = 2E\,t_1 - (\phi_R - \phi_{RT})$$

$$t_2 = \frac{t_1}{n-1} - \frac{\Delta\phi_R}{2E(n-1)}$$

where $\Delta\phi_R = \phi_R - \phi_{RT}$

In practice, it will be found for most coatings that $\Delta\phi_R$ will be proportional to the value of E, then $\Delta\phi_R = KE$ where K is the proportionality constant. Then $$t_2 = \frac{t_1}{n-1} - \frac{K}{2(n-1)}$$

Note that this more accurate formula for $t_2$ is also independent of E. This indicates that the compensating layer technique will perform for a wide range of thickness errors.

The use of a compensating layer such as that disclosed herein permits the reduction or elimination of wavefront error due to thickness variations in coatings applied to existing surfaces. While a preferred embodiment of the inventions has been disclosed herein, it is intended that the scope of the invention only be limited by the extent of permissible interpretation of the claims.

I claim:

1. A method for reducing wavefront errors introduced into an optical signal reflecting from an optical element having a reflection coating thereon, said wavefront errors being due to non-uniform thickness of the reflection coating, said method being comprised of depositing a compensating layer on top of said reflection coating, wherein the thickness of said compensating layer is determined by the formula:

$$t_c = \frac{t_r}{n-1}$$

where:

- $t_c$ is the thickness of the compensating layer
- $t_r$ is the thickness of the reflection coating
- $n$ is the index of refraction of the compensating layer.

2. The method of claim 1 further including the step of depositing an antireflection coating on top of the compensating layer.

3. The method of claim 2 wherein the compensating layer is comprised of at least one of the materials used for the antireflection coating deposited on said compensating layer.

4. A method for reducing wavefront errors introduced into an optical signal reflecting from an optical element having a reflection coating thereon, said wavefront errors being due to non-uniform thickness of the reflection coating, said method being comprised of depositing a compensating layer on top of said reflection coating and further including the step of depositing an antireflection coating on top of the compensating layer, wherein the compensating layer has a thickness determined by the formula:

$$t_c = \frac{t_r}{n-1} - \frac{K}{2(n-1)}$$

and $$K = \frac{\Delta\phi_R}{E}$$

where:

- $t_c$   is the thickness of compensating layer
- $t_r$   is the thickness of the antireflection coating
- $n$   is the index of refraction of the compensating layer
- $K$   is the constant of proportionality between $\Delta\phi_R$ and $E$.
- $\Delta\phi_R$   is the difference in phase at the top of the reflection coating
- $E$   is the thickness error in the coating expressed as a ratio.

* * * * *